US009003289B2

(12) United States Patent
Gregg et al.

(10) Patent No.: US 9,003,289 B2
(45) Date of Patent: Apr. 7, 2015

(54) AUTOMATIC DETECTION OF SUGGESTED VIDEO EDITS

(75) Inventors: John Gregg, Seattle, WA (US); William Brendel, San Francisco, CA (US); Thomas Benton Bridgwater, San Francisco, CA (US); Jason Matthew Toff, San Francisco, CA (US)

(73) Assignee: Google Inc., Mountain View, CA (US)

( * ) Notice: Subject to any disclaimer, the term of this patent is extended or adjusted under 35 U.S.C. 154(b) by 228 days.

(21) Appl. No.: 13/403,936

(22) Filed: Feb. 23, 2012

(65) Prior Publication Data

US 2013/0227415 A1 Aug. 29, 2013

(51) Int. Cl.
*G06F 3/00* (2006.01)
*G11B 27/031* (2006.01)
*G11B 27/28* (2006.01)
*G06K 9/00* (2006.01)
*G06F 17/30* (2006.01)

(52) U.S. Cl.
CPC .............. *G11B 27/031* (2013.01); *G11B 27/28* (2013.01); *G06K 9/00744* (2013.01); *G06F 17/30784* (2013.01)

(58) Field of Classification Search
CPC ........................................................ G06F 3/00
USPC ........................................................ 715/719
See application file for complete search history.

(56) References Cited

U.S. PATENT DOCUMENTS

| 5,553,221 | A | * | 9/1996 | Reimer et al. ................ 715/720 |
| 6,757,027 | B1 | * | 6/2004 | Edwards et al. .............. 348/722 |
| 7,684,096 | B2 | * | 3/2010 | Gonsalves ..................... 358/518 |
| 2006/0251382 | A1 | * | 11/2006 | Vronay et al. .................. 386/52 |
| 2007/0101387 | A1 | * | 5/2007 | Hua et al. ...................... 725/113 |
| 2007/0283269 | A1 | * | 12/2007 | Obrador et al. .............. 715/723 |
| 2009/0313546 | A1 | * | 12/2009 | Katpelly et al. ............. 715/723 |

OTHER PUBLICATIONS

Javed et al, "Image Texture Classification Using Textons," 2011 IEEE.*
Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.

(Continued)

*Primary Examiner* — Matthew Ell
(74) *Attorney, Agent, or Firm* — Amin, Turocy & Watson, LLP

(57) ABSTRACT

Systems and methods are provided herein relating to video classification. A trained classifier can analyze a video for suggested edits. A plurality of features of the video can be analyzed based that determines whether the video is a good candidate for various type of editing. The suggested edits can be performed automatically or with the authorization of a user who submitted the video. The user can review the edited video and either approve or reject the edits. Using an automated process to suggest and perform video edits can improve the quality of videos within a video data store.

19 Claims, 12 Drawing Sheets

(56) References Cited

OTHER PUBLICATIONS

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.

Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

International Search Report and Written Opinion of the International Searching Authority for International Patent Application No. PCT/US13/27532, dated Apr. 9, 2013, 12 pages.

* cited by examiner

AUTOMATIC DETECTION OF SUGGESTED VIDEO EDITS

TECHNICAL FIELD

This application relates to video classification, and, more particularly, to automatic detection of suggested video edits.

BACKGROUND

Video sharing services have become prolific on the internet as faster connection speeds have allowed consumers to upload their own personal videos. Most video sharing services act strictly as an intermediary, in that they give a user a forum to display the user's personal videos. This forum can allow other users, or the public at large, the ability to watch a shared video. Some uploaded videos, however, may possess questionable quality and suffer from issues that make it difficult or impossible for other users or the public to enjoy watching the shared video.

While a user may have the requisite knowledge to upload and share a video, some users do not possess the knowledge or ability to edit a video for known problems. For example, a video can be improperly rotated, have poor lighting, have poor contrast, have an incorrect color balance, or have shakiness issues. Many video editing software suites have the capabilities to correct these and other issues that are present in many shared videos; however, a user may not know that problems exist within their video, which specific problems are afflicting their uploaded video, or the proper process for using video editing software to correct any problems.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular implementations of the specification, or any scope of the claims. Its sole purpose is to present some concepts of the specification in a simplified form as a prelude to the more detailed description that is presented in this disclosure.

Systems and methods disclosed herein relate to video classification and more particularly to automatic detection of suggested video edits. A receiving component can receive a video from a user. A classifier can determine whether the video is a good candidate for editing. If the video is a good candidate for editing, the classifier can generate a list of suggested edits to perform on the video. An editing component can generate an edited video based on the list of suggested edits.

DETAILED DESCRIPTION

Figure 1A:
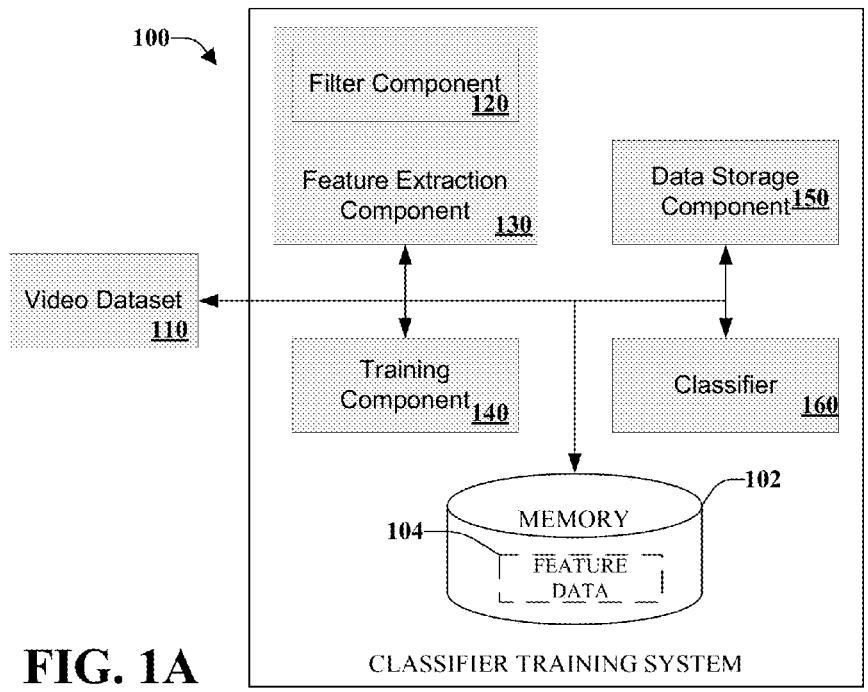
FIG. 1A illustrates a high level functional block diagram of an example classifier training system in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Many videos that are uploaded to video sharing sites have visual problems which can be corrected by software. Some of these problems include an incorrect rotation, poor lighting, poor contrast, improper color balance, or shakiness. Video editing software has the ability to correct these problems; however, many users who upload videos do not know what videos are good candidates for editing or how to edit a video.

In one implementation, systems and methods herein provide for extracting features from a set of videos and using machine learning techniques to identify good candidates for video editing based on the extracted features. Classifiers can be trained to separate good candidates, e.g., videos that would benefit from editing, from bad candidates, e.g., videos that would not benefit from editing.

Systems and methods herein further provide for receiving an uploaded video and classifying the video upon receipt. The user who uploaded the video can be notified of suggested edits for the video. Upon user authorization, the video can be automatically edited. Alternatively, the video can be automatically edited without authorization. By automatically detecting errors in uploaded videos and correcting the uploaded videos for the detected errors, the quality of videos within a universe of stored uploaded videos can be improved.

Turning now to FIG. 1A, there is illustrated a high level functional block diagram of an example of a classifier training system in accordance with implementations of this disclosure. A feature extraction component 130 can extract a set of features from a video amongst a video dataset 110. Feature extraction component 130 can use a filter component 120 to extract the set of features. Filter component 120 can identify visual properties of the video such as a histogram indicating the distribution of light and dark pixels (e.g., contrast level), the suggested camera motion (e.g., shakiness), or the orientation of objects (e.g., incorrect rotation). It can be appreciated that other types of filters can be employed, e.g., including filters for red eye correction, color balance, compression correction, audio and video synching, etc.

For example, filter component 120 can employ a set of filters associated with a histogram indicating distribution of light and dark pixels can be used to extract contrast level features. Respective features that are extracted can be associated with a single filter or multiple filters. Examples of extracted features can include a histogram of local features, a color histogram, edge features, a histogram of textons, face features, camera motion, shot boundary features, audio features, etc Feature extraction component 130 can extract features from the plurality of videos within video dataset 110. Upon extraction, data storage component 150 can store the extracted features as a part of feature data 104 in memory 102.

Training component 140 can use known good candidates for editing and known bad candidates for editing previously identified and stored as a part of feature data 104 to identify previously unknown good candidates or previously unknown bad candidates from video set 110. The newly identified good candidates and/or bad candidates can then be stored by data storage component 150 as a part of feature data 104 and added to the known sets of good and bad candidates associated with individual features. In one implementation, training component 140 can use an independent source of labeling to identify good candidates and/or bad candidates for editing. For example, the independent source could be user annotations or automated annotations where a user or an automated algorithm identifies good candidates for editing and/or bad candidates for editing. In general, the larger the sample of known good and bad editing candidates for each feature, the better the classifier 160 can be trained.

Classifier 160 can then use a set of good candidates for editing and a set of bad candidates for editing stored within feature data 104 (including candidates that training component 140 newly identified) to classify new videos and determine whether a new video is a good candidate or bad candidate for editing.

Various classification (explicitly and/or implicitly trained) schemes and/or systems (e.g., support vector machines, neural networks, expert systems, Bayesian belief networks, fuzzy logic, data fusion engines, AdaBoost classifiers . . . ) can be employed in connection with performing automatic and/or inferred action in connection with the claimed subject matter. To provide for or aid in the numerous inferences described herein, components described herein can examine the entirety or a subset of data available and can provide for reasoning about or infer states of a system, environment, and/or client from a set of observations as captured via events and/or data. Inference can be employed to identify a specific context or action, or can generate a probability distribution over states, for example. The inference can be probabilistic—that is, the computation of a probability distribution over states of interest based upon a consideration of data and events. Inference can also refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources.

A classifier can be a function that maps an input attribute vector, $x=(x1, X2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., AdaBoost, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 1B:
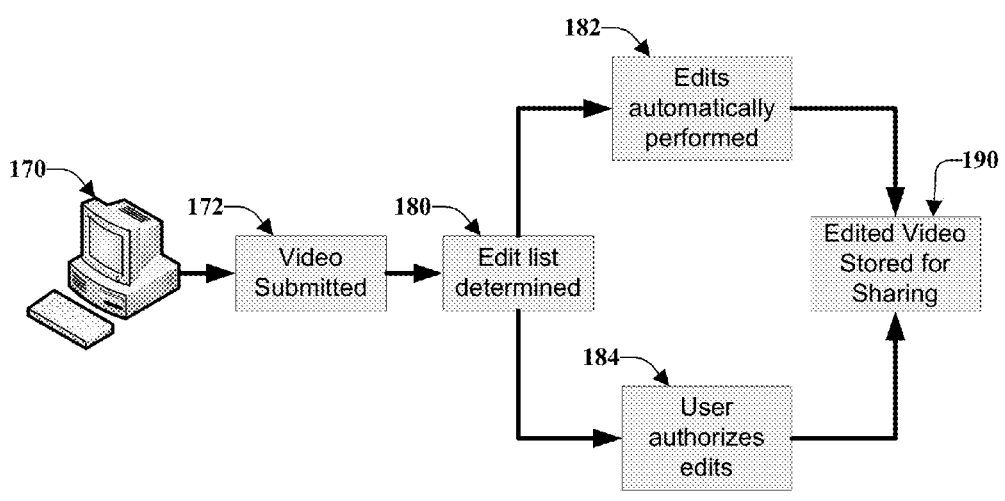
FIG. 1B illustrates a graphical diagram example of automatic detection of suggested video edits and options for performing suggested video edits in accordance with implementations of this disclosure.

Turning now to FIG. 1B, there is illustrated a graphical diagram example of automatic detection of suggested video edits and options for performing suggested video edits in accordance with implementations of this disclosure. A user 170 can submit a video 172 to a video sharing service. It can be appreciated that user 170 can submit a video 172 through a variety of different means such as through a personal computer, a server, a router, a network PC, a workstation, a microprocessor based appliance, a peer device, a smart phone, a tablet, or other network based device. At 180, a suggested edit list can be determined by analyzing the features of video submission 172, using, for example, the classifier 160 as described in regards to FIG. 1A. It can be appreciated that more than one edit list can be determined. For example, multiple suggested edit lists can be created to represent different degrees of change or independent directions of change.

In one implementation, edits can be automatically performed 182 and the edited video can be stored for sharing 190. In another implementation, a user can authorize edits 184 and the edited video based on the user authorization can be stored for sharing 190. In an implementation, the user can undo one or more suggested edits. In one implementation, a user can be presented with multiple suggested edit lists and can view the effects of performing one or more of the suggested edit lists. The user can then determine which of the suggested edits they wish to retain and which they may wish to undo.

Figure 2:
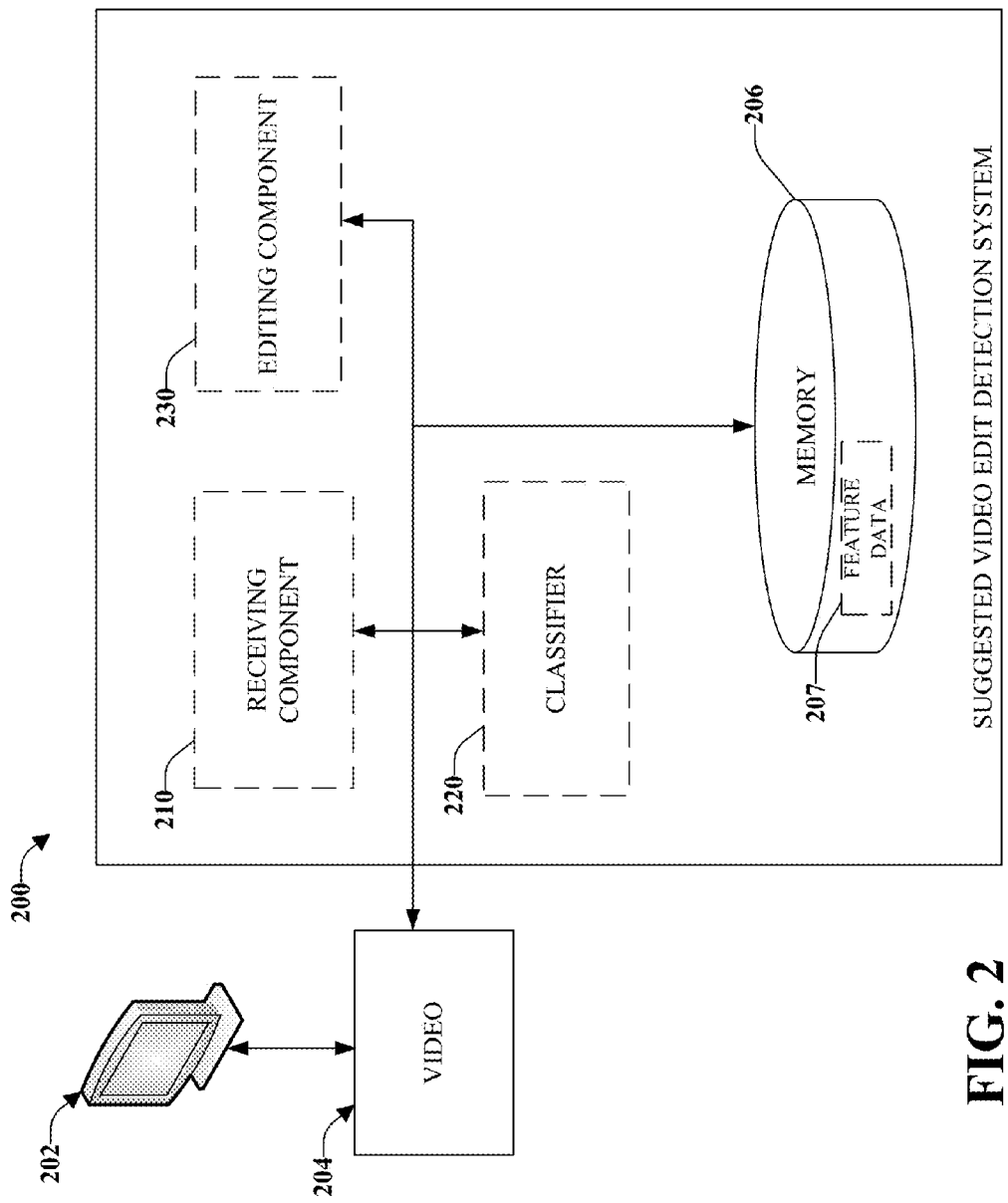
FIG. 2 illustrates a high-level functional block diagram of an example system that generates suggested video edits in accordance with implementations of this disclosure.

Turning now to FIG. 2, there is illustrated a high-level functional block diagram of an example system that generates suggested video edits in accordance with implementations of this disclosure. A user 202 can submit a video 204 to system 200. It can be appreciated that video 204 is not limited to a specific size, file type, compression technique, or content type.

A receiving component 210 can receive the video 204 from the user 202. A classifier 220 can determine whether the video is a good candidate for editing. Classifier 220 can use feature data 207 stored in memory 206 in classifying video 204. If classifier 220 determines that the video is a good candidate for editing, classifier 220 can generate suggested edits to perform on video 204. For example, a suggested edit could include both that video 204 should be rotated and also the direction in which the video should be rotated.

Classifier 220 can be trained on a plurality of features that includes at least one of a histogram of local features, a color histogram, edge features, a histogram of textons, face features, camera motion, shot boundary features, and audio features. For example, classifier 220 can assign a confidence score to a video on whether it is a good candidate for editing, e.g., video is a good candidate for stabilization editing with confidence score of 0.6. Classifier 220 can then compare the confidence score to a threshold to determine whether a feature among the plurality of features makes the video a good candidate for editing. In one implementation, the threshold can be determined by a user, an administrator, or by trained classifier.

An editing component 230 can then generate an edited video based on the suggestions. For example, classifier 220 can determine that video 204 is a good candidate for rotation editing due to the video being detected as improperly oriented. In addition, classifier 220 can determine proper orientation for video 204, and a suggested rotation to properly orient the video. Editing component 230 can then generate a properly oriented edited video based on the classifier determining it was a good candidate for rotation editing and the suggested rotation.

Figure 3:
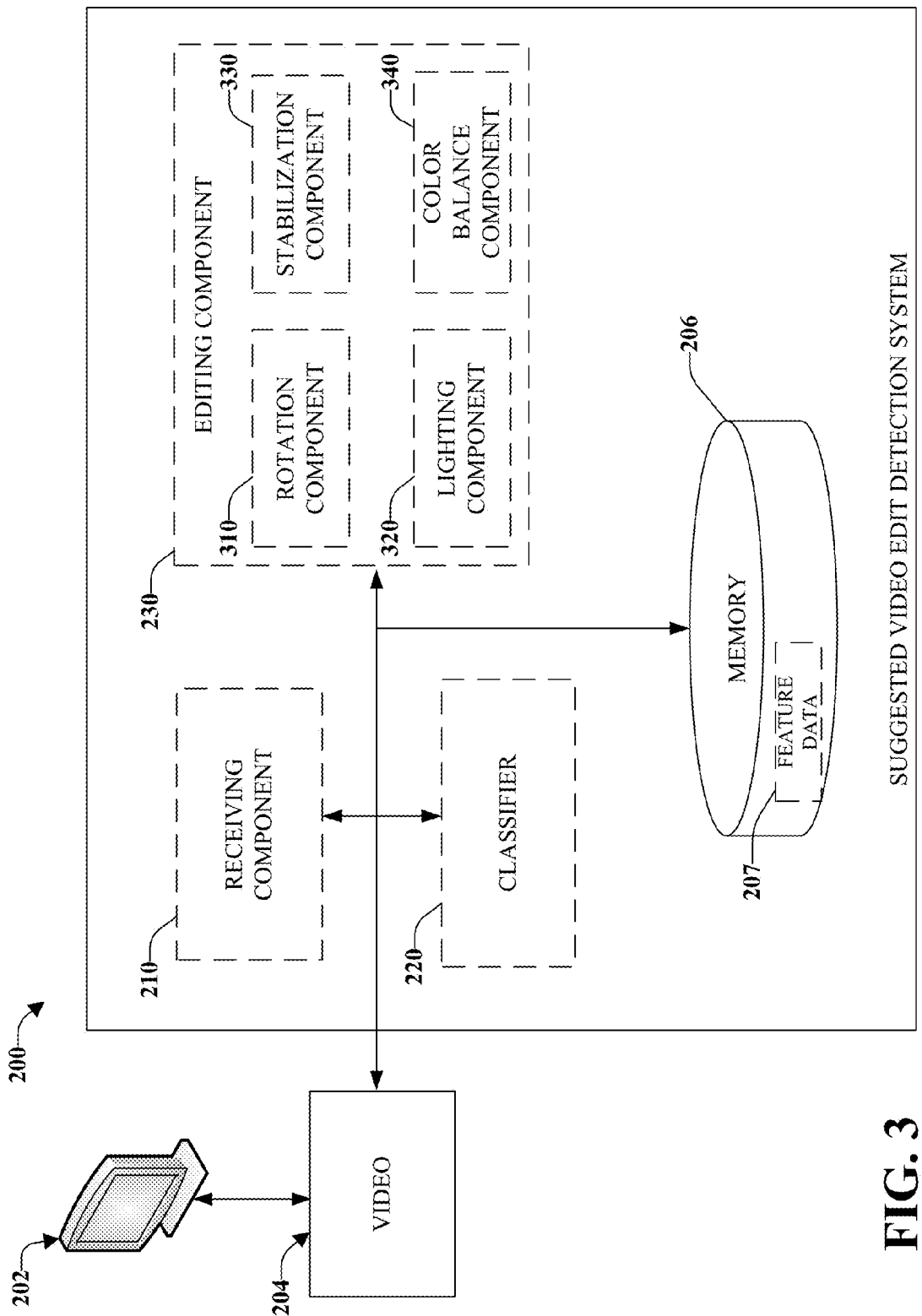
FIG. 3 illustrates a high-level functional block diagram of an example system that generates suggested video edits including subcomponents of the editing component in accordance with implementations of this disclosure.

Turning now to FIG. 3 there is illustrated a high-level functional block diagram of an example system that generates suggested video edits including subcomponents of the editing component in accordance with implementations of this disclosure. Editing component 230 can include subcomponents trained to specific issues with videos. It can be appreciated that the four subcomponents depicted in FIG. 3 are only an example of the possible subcomponents that editing component 230 can utilize to make suggested edits.

A rotation component 310 can rotate the original video based on the suggested edits. For example, the suggested edits can be to rotate the video in a certain direction, e.g., clockwise or counterclockwise, a certain number of degrees. A lighting component 320 can adjust contrast level of the original video based on the suggested edits. For example, the suggested edits can be to increase or decrease the contrast ratio associated with the video a certain level. A stabilization component 330 can stabilize the original video based on the suggested edits. For example, an image that is shaky can be stabilized to prevent disorientation by a viewer of the shaky video.

A color balance component 340 can adjust color balance of the original video based on the suggested edits. For example, some video equipment may record a video with improper color so an object like a fire truck is maroon instead of red. Correcting color balance can render specific colors, such as neutral colors, correctly.

Rotation component 310, lighting component 320, stabilization component 330, and color balance component 340 can operate independent of each other. In an implementation, all subcomponents or a subset of the subcomponents can operate to edit the video.

Figure 4:
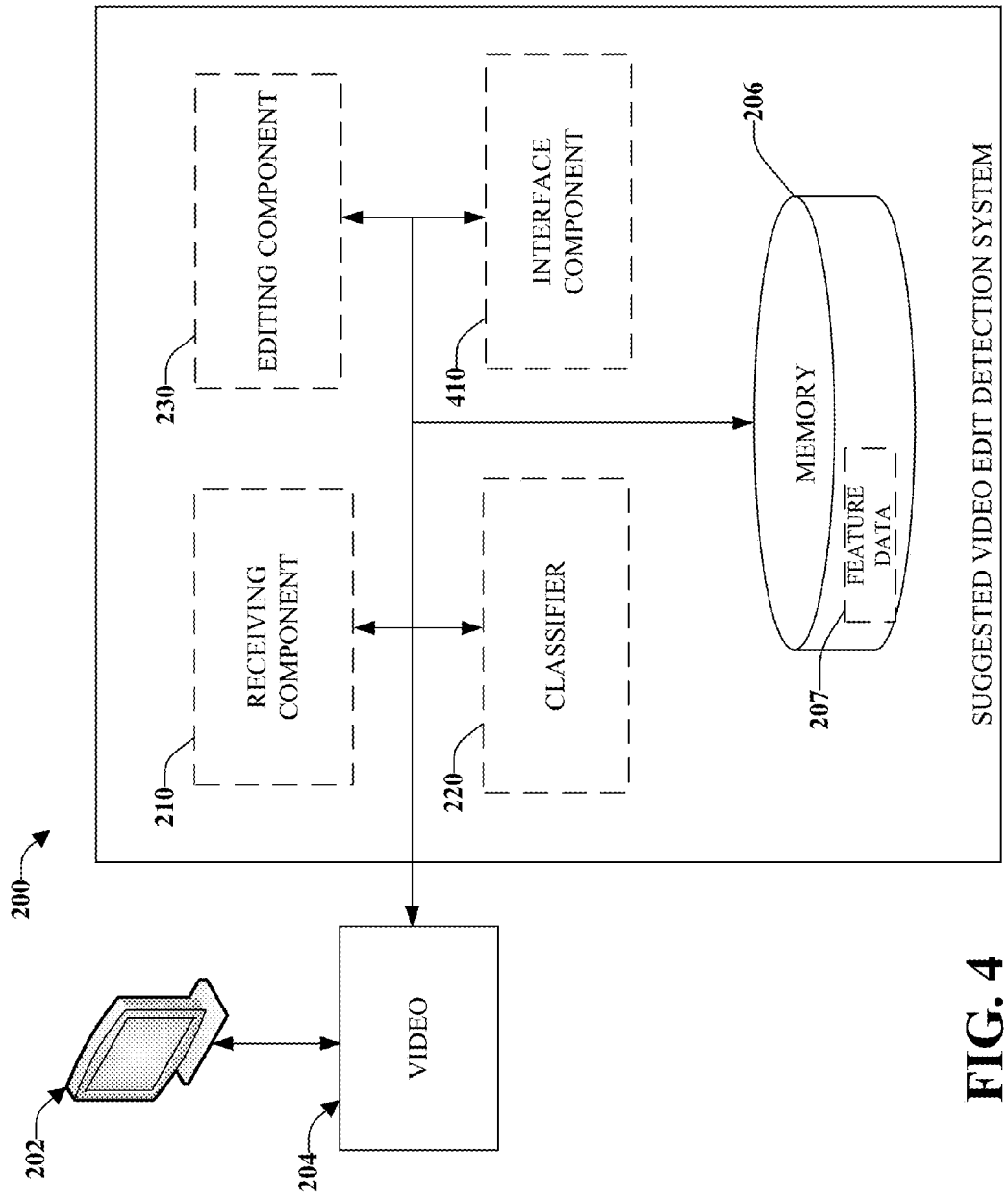
FIG. 4 illustrates a high-level functional block diagram of an example system that generates suggested video edits including an interface component in accordance with implementations of this disclosure.

Turning now to FIG. 4, there is illustrated a high-level functional block diagram of an example system that generates suggested video edits including an interface component 410 in accordance with embodiments described in this disclosure. Interface component 410 can present the suggested edits to the user. For example, a list of suggested edits can be presented to the user. The list can be a global list of all edits in which a user can authorize performance of either all the edits or none of the edits. In another implementation, the user can select individual edits the user desires to be performed on video 204.

In an embodiment, receiving component 210 can receive user authorization to perform a subset of the suggested edits. The user authorization can be based upon the entire set of suggested edits or a subset of suggested edits. Editing component 230 can generate the edited video further based on the user authorization.

In an embodiment, interface component 410 can present the edited video for display to the user. The user can then view the edited video and determine whether the edits made by editing component 230 are desirable to the user. In one implementation, the user can choose to remove any edits made by editing component 230 and be re-presented with a modified edited video based on the user's choice to remove individual edits. The user can be in control of which suggested edits are eventually incorporated into the edited video.

In one embodiment, the interface component can notify users of the types of information that are stored in the respective applications logs and transmitted to the server, and provides the user the opportunity to opt-out of having such information collected and/or shared with the server.

Figure 5:
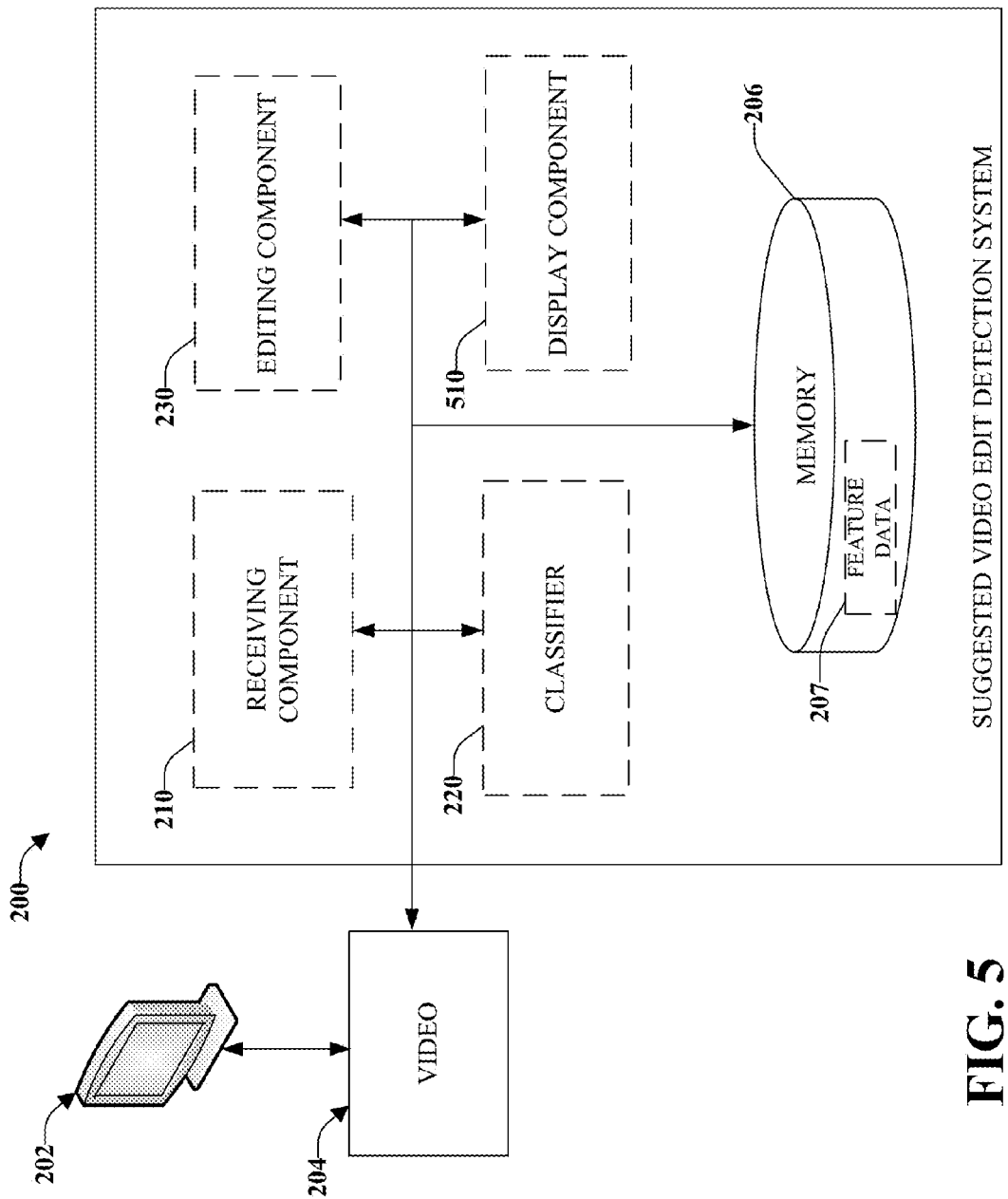
FIG. 5 illustrates a high-level functional block diagram of an example system that generates suggested video edits including a display component in accordance with implementations of this disclosure.

Turning now to FIG. 5, there is illustrated a high-level functional block diagram of an example system that generates suggested video edits including a display component 510 in accordance with implementations of this disclosure. Display component 510 can display the edited video to the user. For example, in an implementation where the suggested edits determined by classifier 220 are automatically performed by editing component 230, display component 510 can display the edited video without interfacing and interacting with the user. In this implementation, a video sharing service provider may desire more control over any uploaded videos and desire all suggested edits be made without choice by the user. Display component 510 can then display the edited video instead of an interface component 410.

Figure 6:
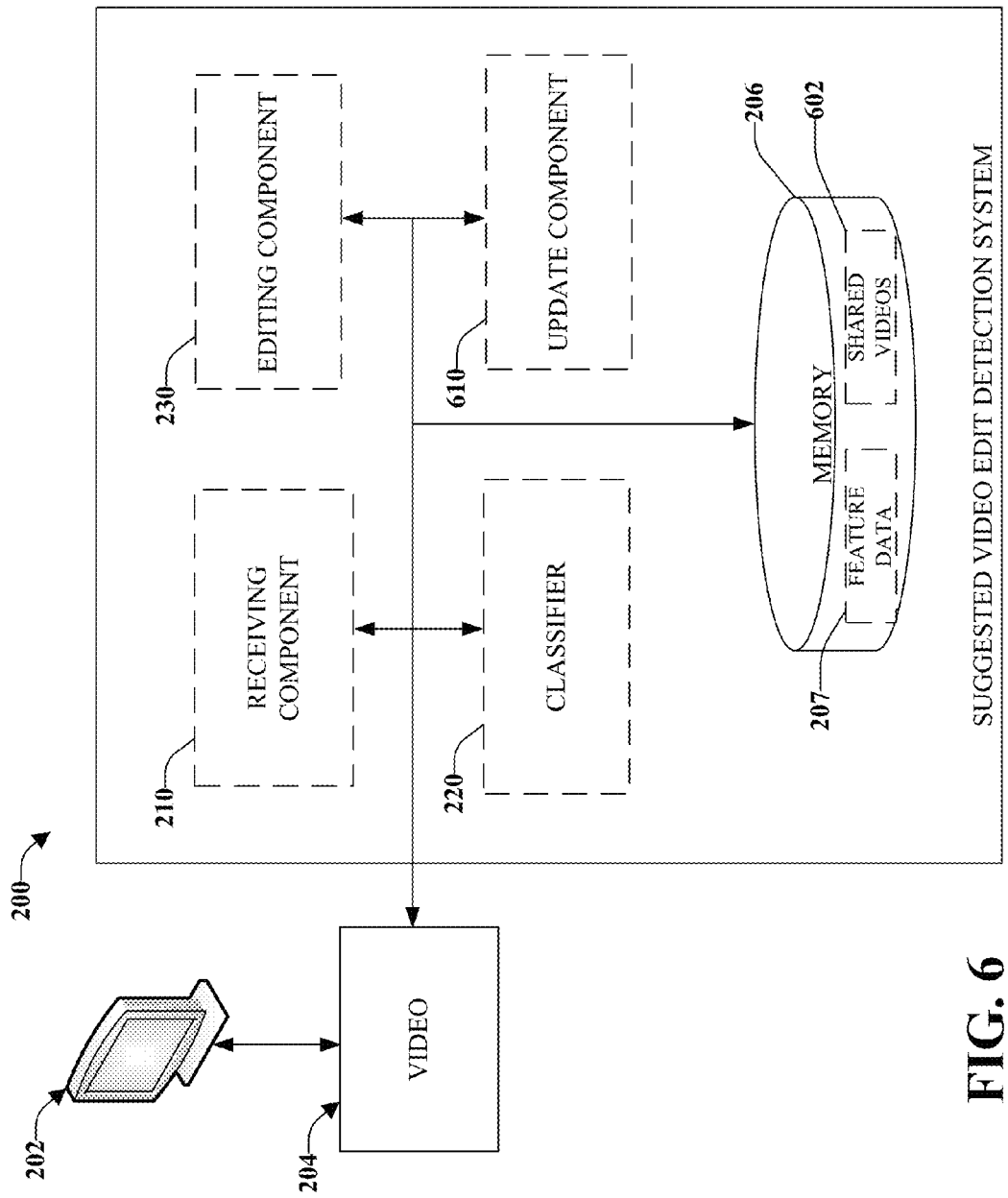
FIG. 6 illustrates a high-level functional block diagram of an example system that generates suggested video edits including an update component in accordance with implementations of this disclosure.

Turning now to FIG. 6, there is illustrated a high-level functional block diagram of an example system that generates suggested video edits including an update component 610 in accordance with implementations of this disclosure. Update component 610 can replace the low quality video 204 with the edited video by storing the edited video into shared video storage 602 in memory 206. It can be appreciated that by replacing video 204 with the edited video, storage space requirements can be minimized as only the edited video is retained for sharing. In one implementation, update component 610 can replace the low quality video 204 with the edited video automatically. In one implementation, the user can select whether to share the original video 204 or the edited video generated by editing component 230. It can be appreciated that a stored universe of shared videos may not reside within system 200 as depicted in FIG. 6 but instead may be part of a distributed computing environment as more fully described in regards to FIG. 11 and FIG. 12.

FIGS. 7-10 illustrate methodologies and/or flow diagrams in accordance with this disclosure. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events.

Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methodologies.

Figure 7:
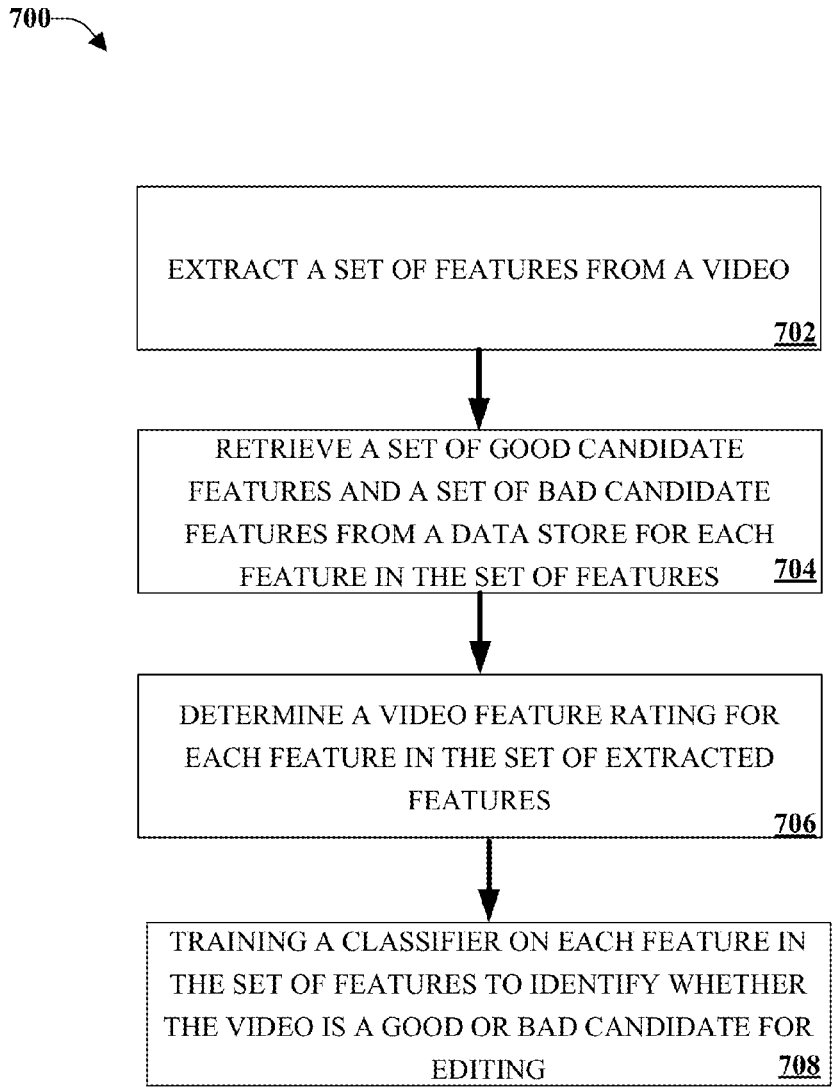
FIG. 7 illustrates an example method for training a classifier to suggest video edits in accordance with implementations of this disclosure.

FIG. 7 illustrates an example method for training a classifier to suggest video edits in accordance with implementations of this disclosure. At 702, a set of features can be extracted (e.g., using a feature extraction component) from a video. The set of features can include a histogram of local features, a color histogram, edge features, a histogram of textons, face features, camera motion, shot boundary features, audio features, etc.

At 704, a set of good candidate features and a set of bad candidate features can be retrieved (e.g., using a data storage component) from a data store for each feature in the set of features. For example, a set of good candidate features associated with an improperly oriented video and a set of bad candidate features associated with a properly oriented video can be retrieved. In this example, good candidate means a good candidate for suggested edits. This process can then repeat for all features extracted at 702.

At 706, a video feature rating can be determined (e.g. using a training component) for each feature in the set of extracted features based on comparing the feature from the video to the set of good candidate features and the set of bad candidate features associated with the feature. For example, if a histogram of edge features of a video more closely resembles the histogram of edge features associated with good candidates for editing, the video feature rating is high. If the histogram of edge features instead more closely resembles the histogram of edge features of bad candidates, the feature rating will be low. It can be appreciated that separate feature ratings can be calculated for each feature that the classifier is training itself to measure.

At 708, a classifier can be trained (e.g. using a training component) on each feature in the set features to identify whether the video is a good or bad candidate for editing.

Figure 8:
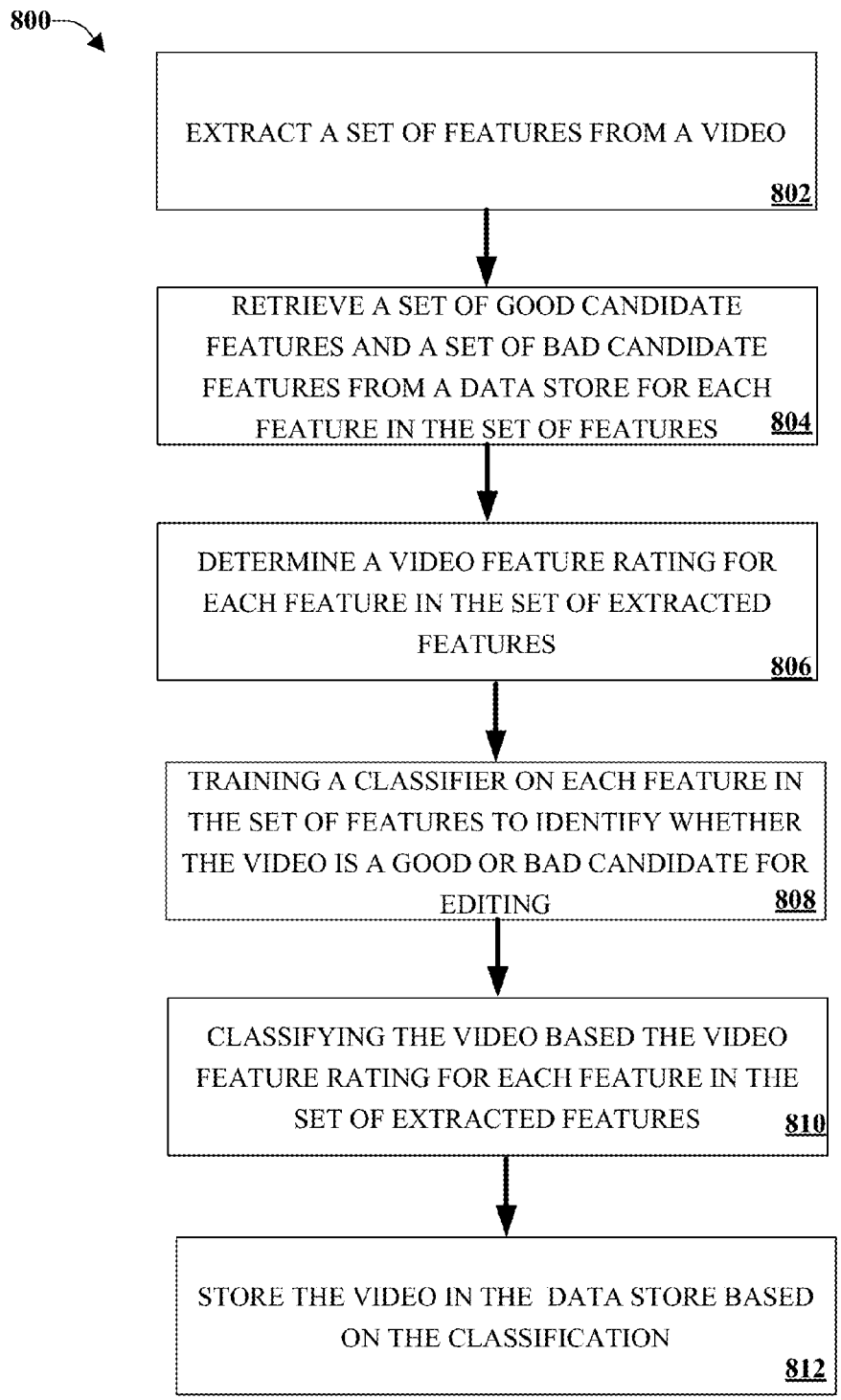
FIG. 8 illustrates an example method for training a classifier to suggest video edits including updating a data store with new training data in accordance with implementations of this disclosure.

FIG. 8 illustrates an example method for training a classifier to suggest video edits including updating a data store with new training data in accordance with implementations of this disclosure. At 802, a set of features can be extracted (e.g., using a feature extraction component) from a video. The set of features can include a histogram of local features, a color histogram, edge features, a histogram of textons, face features, camera motion, shot boundary features, audio features, etc.

At 804, a set of good candidate features and a set of bad candidate features can be retrieved (e.g., using a data storage component) from a data store for each feature in the set of features. For example, a set of good candidate features associated with an improperly oriented video and a set of bad candidate features associated with a properly oriented video can be retrieved. In this example, good candidate means a good candidate for suggested edits.

At 806, a video feature rating can be determined (e.g., using a training component) for each feature in the set of extracted features based on comparing the feature from the video to the set of good candidate features and the set of bad candidate features associated with the feature. For example, if a histogram of edge features of a video more closely resembles the histogram of edge features associated with good candidates for editing, the video feature rating is high. If the histogram of edge features instead more closely resembles the histogram of edge features of bad candidates, the feature rating will be low. It can be appreciated that separate feature ratings can be calculated for each feature that the classifier is training itself to measure.

At 808, a classifier can be trained (e.g., using a training component) on each feature in the set features to identify whether the video is a good or bad candidate for editing.

At 810, the video can be classified (e.g., using a classifier) based on the video feature rating for each feature in the set of extracted features. For example, each feature can be used to associate the video as a good candidate for editing or a bad candidate for editing for the associated feature. At 812, if the video is deemed a good or bad candidate, the extracted features of the video can be added to or aggregated (e.g., using a data storage component) with the existing set of known good candidates or known bad candidates for the associated feature. For example, a feature rating that associates the feature with a set of good candidate features can be added to a data store containing sets of known good candidate features. Similarly, a feature rating that associates the feature with a set of bad candidate features can be added to the data store containing set of known bad candidate features. In the event the video is not deemed a good candidate or a bad candidate, the classifier can ignore the feature data associated with the video. It can be appreciated that the more good candidate examples and bad candidate examples available to the classifier the more likely it will detect suggest edits.

Figure 9:
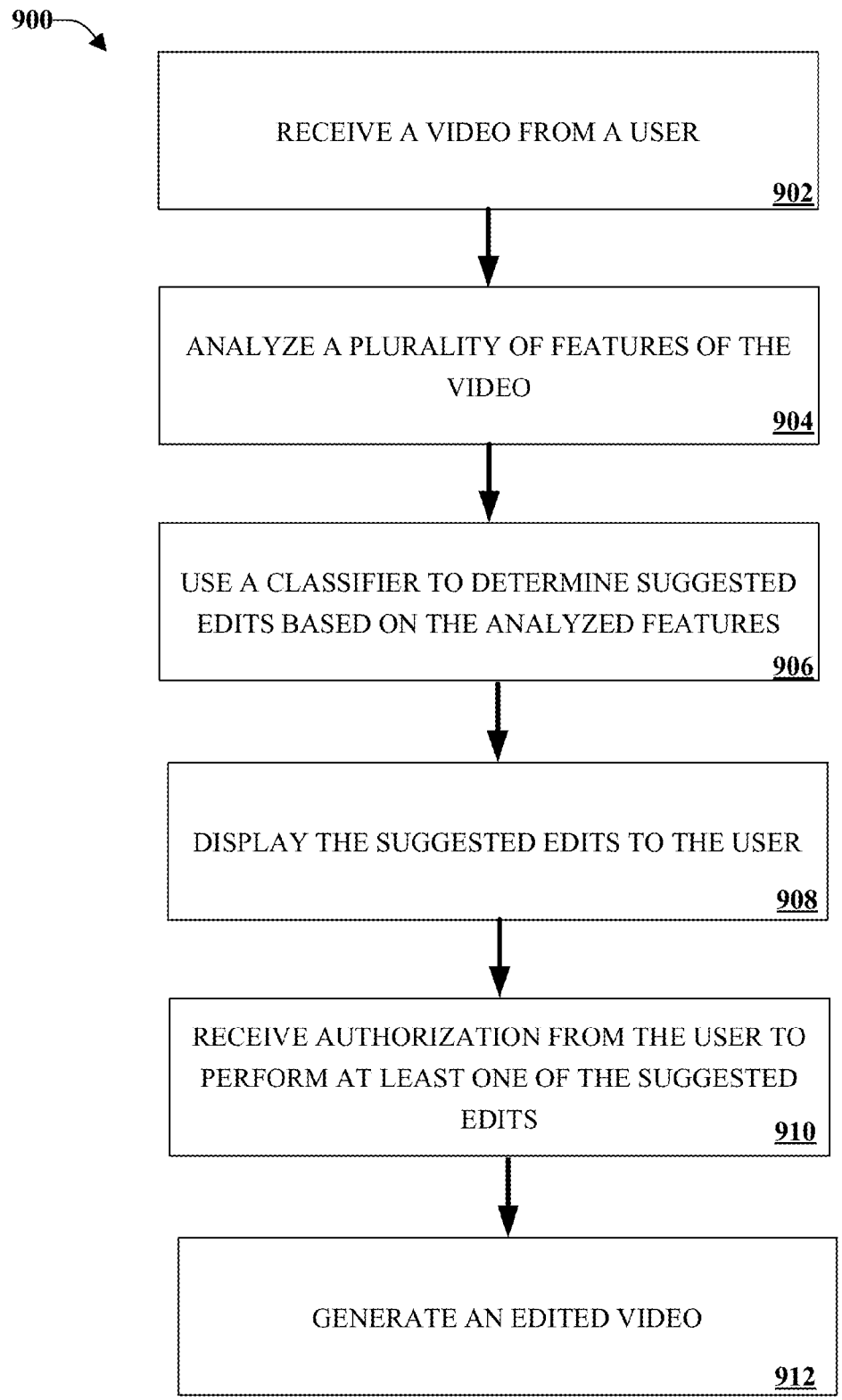
FIG. 9 illustrates an example method for processing a user video submission in accordance with implementations of this disclosure.

FIG. 9 illustrates an example method for processing a user video submission in accordance with implementations of this disclosure. At 902, a video can be received (e.g., by a receiving component) from a user.

At 904, a plurality of features of the video can be analyzed (e.g., using a classifier). The plurality of features can include a histogram of local features, a color histogram, edge features, a histogram of textons, face features, camera motion, shot boundary features, and audio features. At 906, a classifier can determine suggested edits based on the analyzed features.

At 908, the suggested edits can be displayed (e.g., using an interface component) to the user. At 910, authorization can be received (e.g., by a receiving component) from the user to perform at least one of the suggested edits. At 912, an edited video can be generated (e.g., using an editing component).

Figure 10:
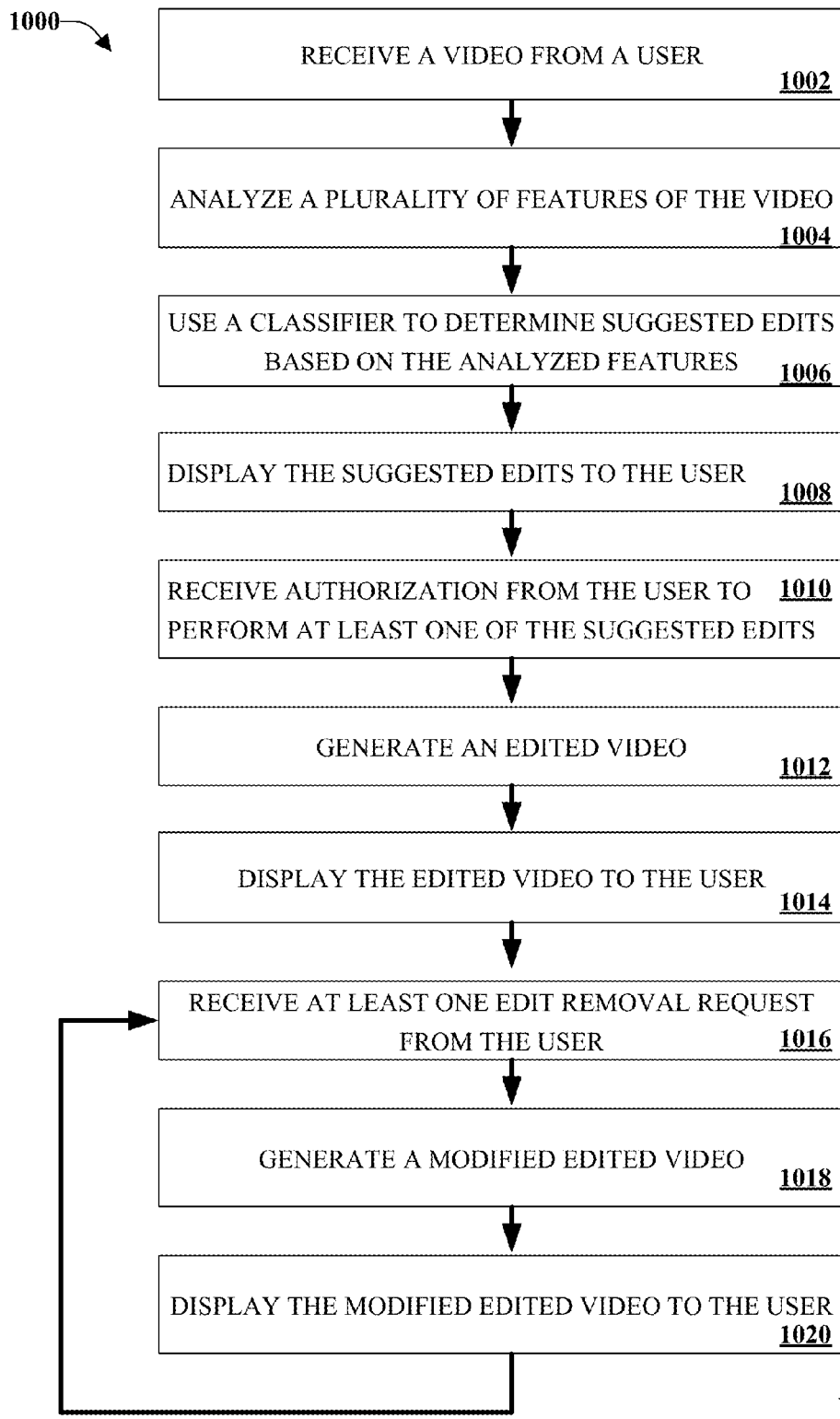
FIG. 10 illustrates an example method for processing a user video submission including modification of edits in accordance with implementations of this disclosure.

FIG. 10 illustrates an example method for processing a user video submission including modification of edits in accordance with implementations of this disclosure. At 1002, a video can be received (e.g., using a receiving component) from a user.

At 1004, a plurality of features of the video can be analyzed (e.g., using a classifier). The plurality of features can include a histogram of local features, a color histogram, edge features, a histogram of textons, face features, camera motion, shot boundary features, and audio features. At 1006, a classifier can determine suggested edits based on the analyzed features.

At 1008, the suggested edits can be displayed (e.g., using an interface component) to the user. At 1010, authorization can be received (e.g., using a receiving component) from the user to perform at least one of the suggested edits. At 1012, an edited video can be generated (e.g., using an editing component).

At 1014, the edited video can be displayed to the user (e.g. using an interface component). At 1016, at least one edit removal request can be received (e.g., using a receiving component) from the user. For example, a user may not appreciate the effects of an edit made at step 1012 and decide to remove a particular edit from the generated edited video. In one implementation, the user can individually select which suggested edits to retain and which to discard.

At 1018, a modified edited video can be generated (e.g., using an editing component). At 1020, the modified edited video can be displayed to the user (e.g., using an interface component). It can be appreciated that the user can continue to select and deselect suggested edits in the modified edited video in order to arrive at a finalized edited video.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or fingerprints); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 11:
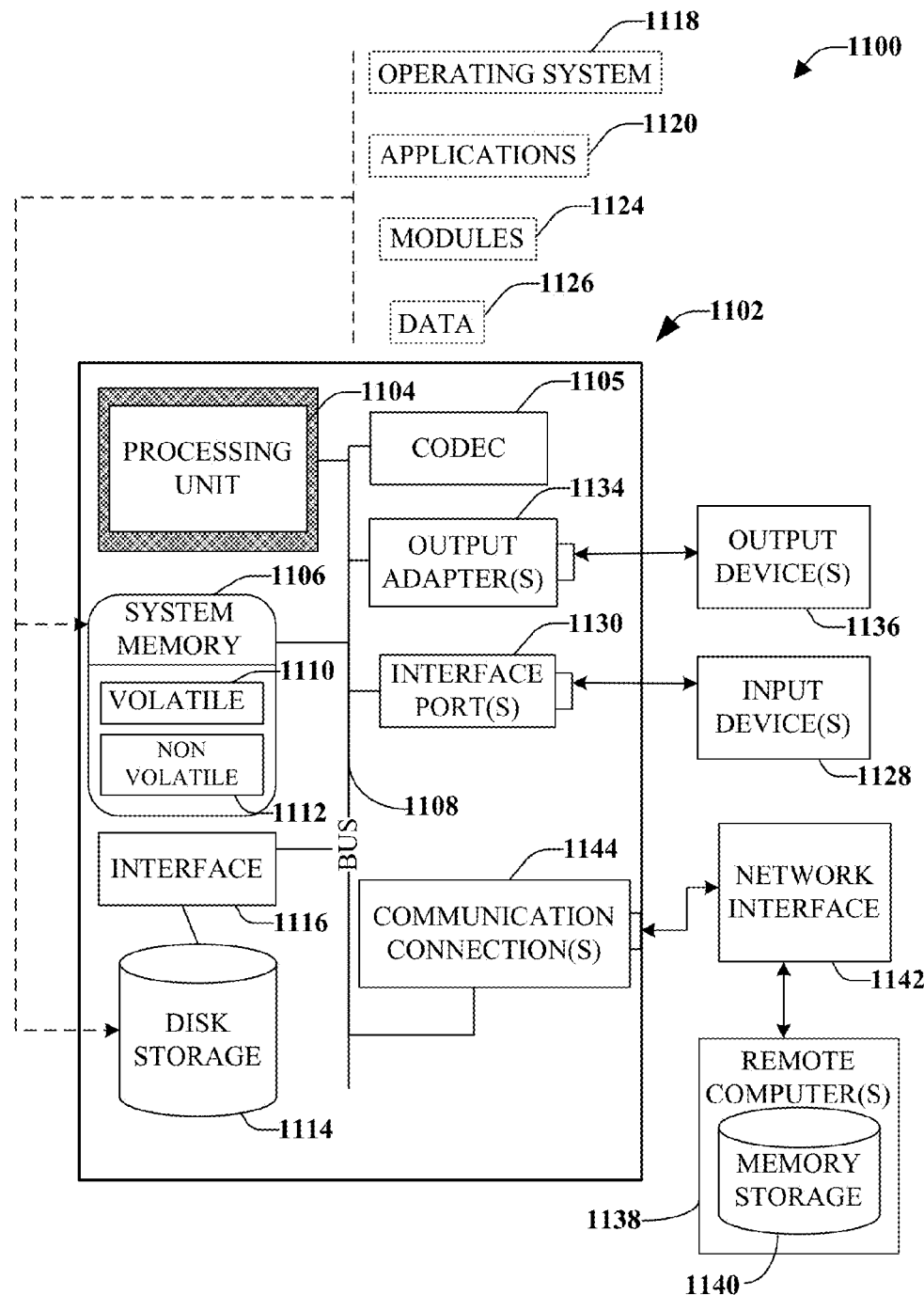
FIG. 11 illustrates an example block diagram of a computer operable to execute the disclosed architecture in accordance with implementations of this disclosure.

With reference to FIG. 11, a suitable environment 1100 for implementing various aspects of the claimed subject matter includes a computer 1102. The computer 1102 includes a processing unit 1104, a system memory 1106, a codec 1105, and a system bus 1108. The system bus 1108 couples system components including, but not limited to, the system memory 1106 to the processing unit 1104. The processing unit 1104 can be any of various available processors. Dual microprocessors and other multiprocessor architectures also can be employed as the processing unit 1104. It can be appreciated that computer 1102 can be used to implement systems as described more fully in regards to FIG. 1A, FIG. 2, FIG. 3, FIG. 4, FIG. 5, and FIG. 6.

The system bus 1108 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1106 includes volatile memory 1110 and non-volatile memory 1112. The basic input/output system (BIOS), containing the basic routines to transfer information between elements within the computer 1102, such as during start-up, is stored in non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), or flash memory. Volatile memory 1110 includes random access memory (RAM), which acts as external cache memory. According to present aspects, the volatile memory may store the write operation retry logic (not shown in FIG. 11) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 1102 may also include removable/non-removable, volatile/non-volatile computer storage media. FIG. 11 illustrates, for example, a disk storage 1114. Disk storage 1114 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1114 to the system bus 1108, a removable or non-removable interface is typically used, such as interface 1116.

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer system 1102. Applications 1120 take advantage of the management of resources by operating system 1118 through program modules 1124, and program data 1126, such as the boot/shutdown transaction table and the like, stored either in system memory 1106 or on disk storage 1114. Example of applications include classifying operations, receiving and storing video over a network connection, performing video editing tasks and generating edited videos, etc. It is to be appreciated that the claimed subject matter can be implemented with various operating systems or combinations of operating systems.

A user enters commands or information into the computer 1102 through input device(s) 1128. Input devices 1128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s) 1128. Thus, for example, a USB port may be used to provide input to computer 1102, and to output information from computer 1102 to an output device 1136. Output adapter 1134 is provided to illustrate that there are some output devices 1136 like monitors, speakers, and printers, among other output devices 1136, which require special adapters. The output adapters 1134 include, by way of illustration and not limitation, video and sound cards that provide a means of connection between the output device 1136 and the system bus 1108. It should be noted that other devices and/or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1144 refers to the hardware/software employed to connect the network interface 1142 to the bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

Figure 12:
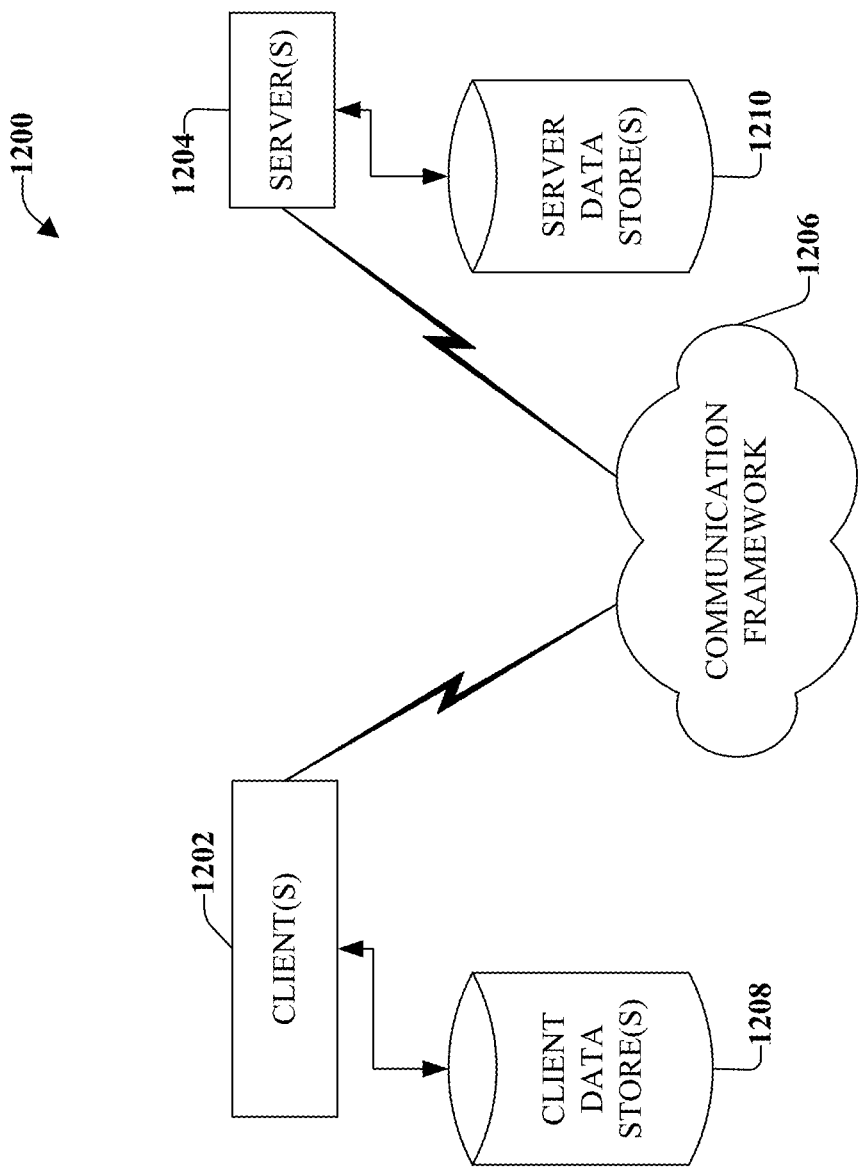
FIG. 12 illustrates an example schematic block diagram for a computing environment in accordance with the subject specification in accordance with implementations of this disclosure.

Referring now to FIG. 12, there is illustrated a schematic block diagram of a computing environment 1200 in accordance with the subject specification. The system 1200 includes one or more client(s) 1202, which can include an application or a system that accesses a service on the server 1204. The client(s) 1202 can be hardware and/or software (e.g., threads, processes, computing devices). The client(s) 1202 can house cookie(s), metadata, and/or associated contextual information by employing the specification, for example.

The system 1200 also includes one or more server(s) 1204. The server(s) 1204 can also be hardware or hardware in combination with software (e.g., threads, processes, computing devices). The servers 1204 can house threads to perform, for example, video classifying, video editing, feature extraction, video storage, or video displaying in accordance with the subject disclosure. One possible communication between a client 1202 and a server 1204 can be in the form of a data packet adapted to be transmitted between two or more computer processes where the data packet contains, for example, an audio sample. The data packet can include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methodologies for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
one or more computer processors; and
a non-transitory memory that stores instructions, which when executed by the one or more computer processors, cause the one or more computer processors to perform operations, comprising:
receiving a video;
extracting one or more features from the video;
determining video feature information for an extracted feature of the one or more features, wherein the determining is based on comparing the extracted feature to a first set of candidate features and a second set of candidate features associated with the extracted feature;
training a classifier on the one or more features to identify whether the video is the first type of candidate for editing or the second type of candidate for editing, wherein the training comprises adding the extracted feature to the first set of candidate features or adding the extracted feature to the second set of candidate features based on the determining;
determining whether the video is associated with a defined type of candidacy for editing based on the one or more features and training data, wherein based on a determination that the video is associated with the defined type of candidacy for editing, the classifier generates at least one suggested edit to perform on the video;
generating an edited video by editing the video based on the at least one suggested edit; and
sending for display, by a server, textual information descriptive of the at least one suggested edit for viewing by a user.

2. The system of claim 1, wherein the operations further comprise:
rotating the video based on the at least one suggested edit.

3. The system of claim 1, wherein the operations further comprise:
adjusting at least one of contrast or brightness level of the video based on the at least one suggested edit.

4. The system of claim 1, wherein the operations further comprise:
stabilizing the video based on the at least one suggested edit.

5. The system of claim 1, wherein the operations further comprise:
adjusting color balance of the video based on the at least one suggested edit.

6. The system of claim 1, wherein the at least one suggested edit comprises a plurality of suggested edits, and wherein the operations further comprise receiving a user authorization to perform a subset of the plurality of suggested edits after presentation of the textual information descriptive of the at least one suggested edit and prior to generation of the edited video.

7. The system of claim 6, wherein the interface component also operations further comprise displaying the edited video for viewing by the user.

8. The system of claim 1, wherein the one or more features comprises at least one of a histogram of local features, a color histogram, one or more edge features, one or more face features, one or more shot boundary features or one or more audio features.

9. A method, comprising:
employing a processor to execute computer executable instructions stored in a memory to perform operations comprising:
extracting one or more features from a video;
retrieving, from a data store, for an extracted feature of one or more extracted features, a first set of candidate features and a second set of candidate features;
determining a video feature rating for the extracted feature, wherein the determining is based on comparing the extracted feature to the first set of candidate features and the second set of candidate features associated with the extracted feature; and
training a classifier on the one or more extracted features to identify whether the video is a first type of candidate for editing or a second type of candidate for editing, wherein the training comprises adding the extracted feature to the first set of candidate features or adding the extracted feature to the second set of candidate features based on the determining.

10. The method of claim 9, further comprising:
classifying the video based on a video feature rating for the extracted feature, wherein the video feature rating is determined for the extracted feature based on comparing the extracted feature with the first set of candidate features and the second set of candidate features.

11. The method of claim 10, further comprising:
storing the video in the data store based on classification of the video.

12. The method of claim 9, wherein the one or more extracted features comprises at least one of: a histogram of local features, a color histogram, one or more edge features, a histogram of textons, one or more face features, camera motion, one or more shot boundary features or one or more audio features.

13. The method of claim 9, wherein the training further comprises generating a first decision to forego addition of the extracted feature to the first set of candidate features and generating a second decision to forego addition of the extracted feature to the second set of candidate features based at least one the determining.

14. A method, comprising:
employing a processor to execute computer executable instructions stored in a memory to perform operations comprising:
receiving a video from a user;

extracting one or more features of the video;

using a classifier to determine one or more suggested edits to the video based on the one or more features and a set of training data;

after displaying the one or more suggested edits for viewing by the user, wherein the one or more suggested edits comprise textual information describing the one or more suggested edits, receiving authorization from the user to perform at least one of the one or more suggested edits;

editing the video based on the authorized at least one of the one or more suggested edits to generate an edited video;

determining a video feature rating for an extracted feature of the one or more features, wherein the determining is based on comparing the extracted feature to a first set of candidate features and a second set of candidate features associated with the extracted feature; and training the classifier on the one or more extracted features to identify whether the video is a first type of candidate for editing or a second type of candidate for editing, wherein the training comprises adding the extracted feature to the first set of candidate features or adding the extracted feature to the second set of candidate features based on the determining.

15. The method of claim 14, further comprising:
displaying the one or more suggested edits for viewing by the user.

16. The method of claim 14, further comprising:
displaying the edited video for viewing by the user.

17. The method of claim 16, further comprising:
receiving at least one edit removal request from the user; and
generating a modified edited video based on the at least one edit removal request.

18. The method of claim 17, further comprising:
displaying the modified edited video for viewing by the user.

19. The method of claim 14, wherein the one or more features comprises at least one of a histogram of local features, a color histogram, one or more edge features, a histogram of textons, one or more face features, camera motion, one or more shot boundary features or one or more audio features.

* * * * *